United States Patent [19]

Rynik

[11] 4,273,385
[45] Jun. 16, 1981

[54] DEVICE FOR SAFETY GUIDING OF HAULING CHAIN ESPECIALLY AT RANGING DRUM SHEARER IN COAL MINING

[75] Inventor: Jan Rynik, Gliwice, Poland

[73] Assignee: Politechnika Slaska im. Wincentego Pstrowskiego, Gliwice, Poland

[21] Appl. No.: 60,426

[22] Filed: Jul. 25, 1979

[30] Foreign Application Priority Data

| Jul. 24, 1978 [PL] | Poland | 208629 |
| Dec. 5, 1978 [PL] | Poland | 211507 |
| Mar. 2, 1979 [PL] | Poland | 213841 |

[51] Int. Cl.$^3$ .................. E21C 35/04; E21C 29/20
[52] U.S. Cl. .................................... 299/42; 299/12
[58] Field of Search .................. 299/32, 34, 42, 43

[56] References Cited

U.S. PATENT DOCUMENTS

| 3,602,549 | 8/1971 | Renzing et al. | 299/43 |
| 3,784,256 | 1/1974 | Katlic | 299/43 X |
| 4,025,118 | 5/1977 | Lanfermann et al. | 299/43 |

FOREIGN PATENT DOCUMENTS 1413210  12/1975  United Kingdom ............ 299/43

*Primary Examiner*—Ernest R. Purser

*Attorney, Agent, or Firm*—Ladas & Parry

[57] ABSTRACT

A device for safety guiding of hauling chain, especially for a ranging drum shearer in coal mining equipment having chain haulage means, consists of chain screening /5/ at a guard /6/ of conveyor /7/ and of chain guides /11/ fixed to a ranging shearer /1/, wherein said guides /11/ travel along the route of conveyor /7/ inside the screening placed at chain guard /6/. The screening of hauling chain /5/ is confined by screening plates /12/, /13/ and /14/ at the upper part of chain guard /6/, having its uncovered side closed by screening end /20/ of a double end lever /15/, pivoted in hub /16/ below the lower screening plate /12/. The retaining end /20/ of double end lever /15/ is closed by the tension of spring /17/, attached by one end to the retaining end /18/ of lever /15/ and by another to a grip /19/ fixed to the body of the guard /6/. Alternatively, the screening of hauling chain /5/ is placed at the lower part of guard /6/ and confined by a guiding pipe /10/ together with screening plates /26/ and /27/, wherein the uncovered screening side is closed by double end lever /28/ pivoted on journal /29/ which is fixed to the body of guard /6/. The double end lever /28/ is closed by tension of the spring /30/, attached at one of its ends to a retaining end /31/ and at its other end to the grip /33/ fixed to the body of guard /6/.

10 Claims, 7 Drawing Figures

DEVICE FOR SAFETY GUIDING OF HAULING CHAIN ESPECIALLY AT RANGING DRUM SHEARER IN COAL MINING

BACKGROUND OF THE INVENTION

The objective of an invention is the device for safety guiding a hauling chain, especially for a ranging drum shearer for use in coal mining.

Up till now, known structures of chain haulage drives for ranging drum shearers have been equipped with a driving sprocket matching a link chain spanned or circulating along a conveyor route.

Free spanned and unprotected hauling chain, as used in these structures, presents a steady endangering for the team at a coal face. Very often accidents occur due to random chatter or displacement of the chain, caused by dynamic loads or link cracking, when worn or of failure. So there is an endagering space along the hauling chain that disturbs the full yield work of the coal face team. There are also other essential disturbances of the coal face work, such damage or unloading of the face conveyor due to entering the chain into a conveyor chute and by chain banging against timbering, thus reducing its efficiency.

In order to diminish random lateral chatter of the chain, it has been known to use grips and supports to secure the chain at holding posts spaced at 10 to 50 meters along the coal face. Such equipment is commonly attached to the upper part of the conveyor guard along its route. Removable enclosures of most known structures are put on and taken off by hand according to the shearing machine displacement. The enclosures are shaped as tube sections, bent bars, jaws and lever sets, being locked by means of bolts, wedges and latches. Known also are structures to limit the lateral chain movements, formed as levers that close by themselves under gravitation force or prestressed springs built inside the enclosures bodies. Applying separate chain holding devices along the ranging shearer route requires strong structures, resulting in their large overall dimensions and in strengthened posts to fasten them at the route, so they can endure great forces, being a component of the chain tension. This requires organizational and safety rules by working personnel at the coal face to avoid collision of the ranging shearer entering the chain support. The defficiency of these chain enclosures lies also in their low effectiveness at work, because they do not eliminate the lateral chain chatter at distances between two neighbouring supports and create difficulty by exploitation work at the coal face.

SUMMARY OF THE INVENTION

The objective of this invention is the structural application of a device for safe guiding of hauling chain in a screening applied along the coal shearer route at the conveyor guard, in order to avoid the above deficiencies. This target has been reached by the use of the solution of the invention.

According to this invention, the coal shearer haulage is equipped with chain screening placed along the entire shearer route, wherein the chain parts before and behind the ranging shearer are secured in screenings placed at the conveyor guard. The hauling chain is directed into the screened space by means of chain guides in the form of idler sprockets or adequately shaped sliding guides, attached to the shearer nearby its slide shoes. As soon as the chain comes into the screened space its uncovered side is closed by covering elements in the form of levers acting under a spring force which elements are opened by abutting face of the chain guide. The chain guides for directing hauling chain into the screened space are attached nearby the slide shoes of the ranging shearer to keep the screening cross section of the hauling chain as small as possible.

The advantage of the improved safety guide for hauling chain is to provide safer working conditions for the team at the coal face, undisturbed shearer work and timbering maintenance, resulting in the possibility of operators to approach the ranging shearer and its haulage route, with increased excavation yield.

A very important feature of the device is that the forces acting on the screening are confined to the smallest limits, as they occur in lateral tension components at the route bend, never exerting the chain link pressure upon the screening plates and covering elements of more than 5% of the tension force at the maximal screening bend. Thus the lateral forces, being kept to the smallest degree, enable one to diminish the size and weight of the screening parts. Another advantage of the device is the simple mechanical structure which can be applied for a variety of chain haulage kinds.

DETAILED DESCRIPTION

Figure 1:
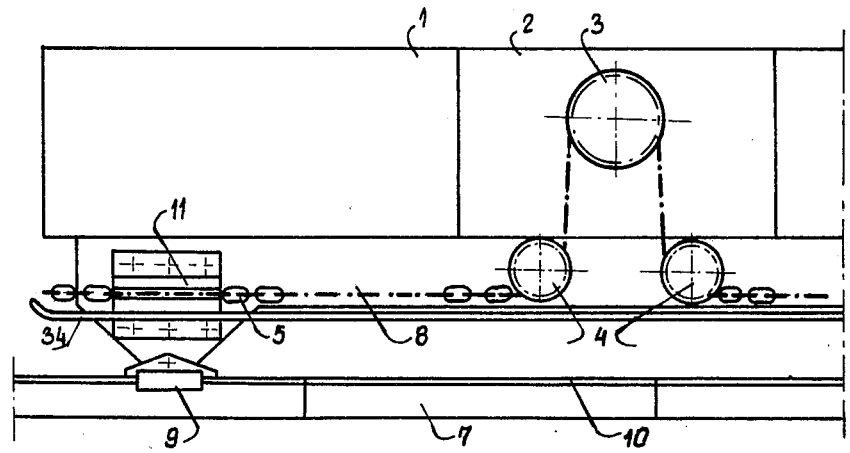
FIG. 1 is a front view of a coal ranging shearer with chain guide.
Figure 2:
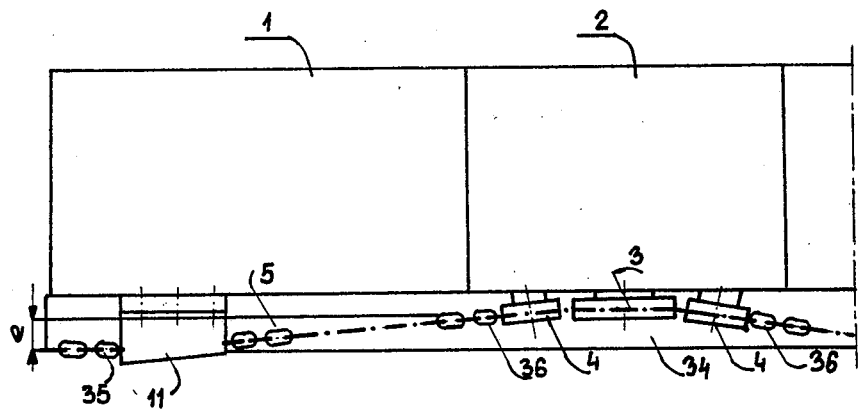
FIG. 2 an upper view of the coal ranging shearer with chain guide.
Figure 3:
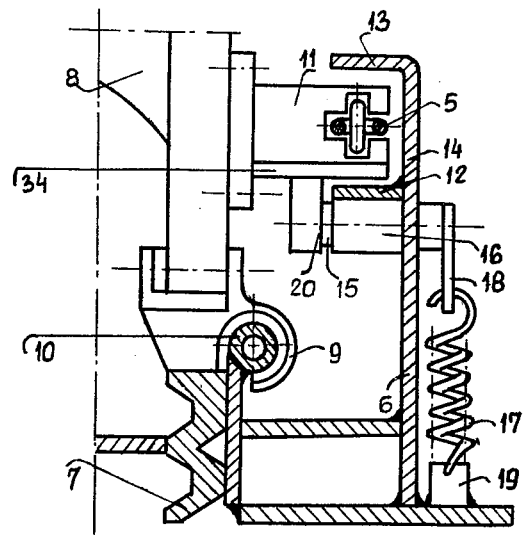
FIG. 3 a cross-section through the conveyor guard with the chain screening placed at the upper part of the guard, FIG. 4 a cross-section through the chain screening with a double end lever, FIG. 5 a front view of the screening with a double end lever, FIG. 6 a cross-section through a conveyor guard with chain screening and a double end lever attached above the upper screening plate, and FIG. 7 a cross-section through a conveyor guard with chain screening placed at the lower guard part.
Figure 4:
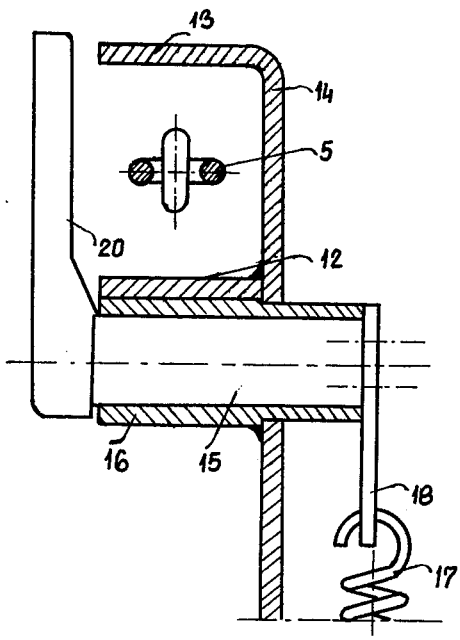
Figure 5:
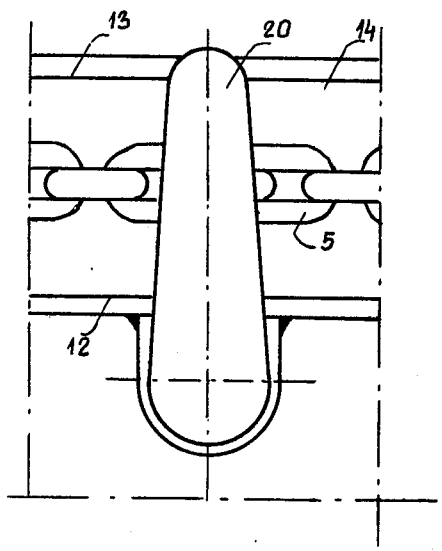
Figure 6:
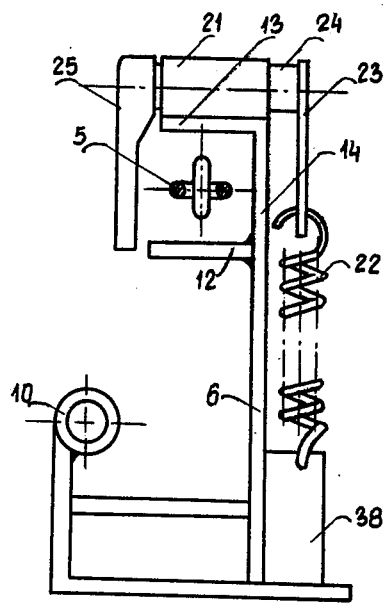
Figure 7:
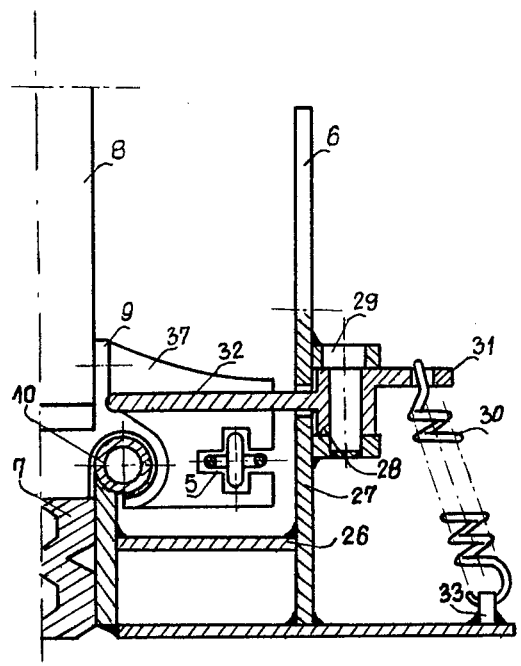

The device for safety guiding of hauling chain consists of chain guides 11 fixed to the shearer slide 8 above slide shoes 9 of coal shearer 1. The hauling chain 5, matching the driving sprocket 3 and idler sprockets 4 of hauling drive 2, is directed into the screening in guard 6 of the conveyor 7 by means of chain guides 11. The chain spans in front of and behind the slide shoes 9 of the coal shearer 1 are placed in the screening attached to the upper part of the guard 6 and confined by screening plates 12, 13 and 14. The uncovered screening side is closed by screening end 20 of a double end lever 15, pivoted in a hub 16 which is attached below the lower screening plate 12. The screening end 20 of the double end lever 15 is closed by the aid of tension spring 17 with one end gripped to the retaining end 18 of the lever 15, and with another end in the spring grip 19 fixed to the guard 6 of conveyor 7. The chain guides 11 are provided with bumpers 34 underneath to open the screening ends 20 of levers 15. The link 35 of chain 5, at the moment of leaving its guide 11 to enter the screening, is laterally displaced from link 36 of chain 5, coming off the idler sprocket 4, at a distance of at least 15 mm.

An alternative example of the double end lever, according to this invention has the lever 24 pivoted in the hub 21 attached above the upper screening plate 13 of the hauling chain 5. Screening end 25 of the lever 24 is closed by the tension force of spring 22 fixed by one of its ends to the retaining end 23 of lever 24 and by another end to the grip 28 attached to the body of conveyor guard 6.

An alternative example of the chain screening according to this invention is the screening placed at the lower part of guard 6 of the chain 7, confined by guiding pipe 10 and screening plates 26 and 27. The uncovered side of the screening is closed by screening end 32 of the double lever 28 pivoted on journal 29 fixed to the guard 6 body of conveyor 7. Screening lever end 32 is kept in closed position by tension of spring 30, the one end of which is attached to the bumping lever end 31 and the second to the grip 33 fixed to the guard 6 body of conveyor 7. The shoe 9 of slide 8 of the ranging shearer 1 includes at the side of guard 6 a buffer 37 in order to open the screening end 32 of the double lever 28.

What we claim is:

1. A device for safety guiding a hauling chain, adapted for a ranging drum shearer in a coal mining apparatus equipped with chain haulage drive means comprising means for screening the hauling chain along a guard rail assembly adjacent a conveyor, and chain guide means having screening plates are fixed to the ranging drum shearer, wherein said guide means are mounted for translation movements along the route of the conveyor inside the screening means of said guard assembly.

2. The device as defined in claim 1, wherein the screening of the hauling chain is mounted at the upper part of said guard rail assembly and confined on three sides by screening plates, the uncovered part of said screening being closed by a screening end portion of a double end lever which is pivotally mounted in a hub attached below the lower plate of said chain screening means.

3. The device as defined in claim 2, wherein said screening end portion of said double end lever is maintained normally closed by the tension of a spring attached by one end to a retaining end of said lever and by another end to a grip fixed to the body of said guard rail assembly.

4. The device as defined in claim 2, wherein the uncovered side of said screening is closed with a double end lever pivoted in a hub over the upper screening plate with a screening end portion of said lever being normally closed by tension a spring, attached by one of its ends to a retaining end of said lever and by another end to a grip fixed to the body of said guard rail assembly.

5. The device as defined in claim 1, wherein said screening means for the hauling chain is placed in the lower part of said guard rail assembly, so that the chain screening is confined by a guiding pipe and a pair of screening plates with the uncovered screening side being closed by a lever, pivoted on a journal fixed to the body of said guard rail assembly.

6. The device as defined in claim 5, wherein said lever is closed by the tension of a spring, attached by one of its ends to a retaining end of the lever and by the other end to a grip fixed to the body of said guard rail assembly.

7. The device as defined in claim 2, wherein the chain guide means include at their lower part bumpers adapted to abut the screening end portion of said lever to pivot the lever and open the chain screening means.

8. The device as defined in claim 7, wherein each chain link of said chain, when leaving the chain guide means into the screened space, is laterally displaced from a corresponding link, that leaves an idler sprocket of the chain drive means at a distance of at least 15 mm.

9. The device as defined in claim 7, wherein said chain guide means are placed over slide shoes mounted on said ranging shearer.

10. The device as defined in claim 9, wherein said shoe has a buffer directed toward said guard rail assembly to open the screening end of said lever.

* * * * *